US011768561B2

(12) United States Patent  
Yao et al.

(10) Patent No.: US 11,768,561 B2  
(45) Date of Patent: Sep. 26, 2023

(54) APPARATUS, SYSTEM, AND METHOD FOR DATA SMOOTHING

(71) Applicant: Lenovo (Singapore) Pte. Ltd., Singapore (SG)

(72) Inventors: Qiang Yao, Kanagawa (JP); Mitsuhiro Yamazaki, Kanagawa (JP); Keiichi Yoshitomi, Kanagawa (JP); Yoshitsugu Suzuki, Kanagawa (JP); Seiichi Kawano, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/859,285

(22) Filed: Jul. 7, 2022

(65) Prior Publication Data

US 2023/0045137 A1    Feb. 9, 2023

(30) Foreign Application Priority Data

Aug. 6, 2021 (JP) ................................ 2021-130037

(51) Int. Cl.  
*G06F 3/041* (2006.01)  
*G06F 3/0354* (2013.01)

(52) U.S. Cl.  
CPC ........ *G06F 3/0418* (2013.01); *G06F 3/03545* (2013.01)

(58) Field of Classification Search  
CPC ............................. G06F 3/0418; G06F 3/03545  
See application file for complete search history.

(56) References Cited

U.S. PATENT DOCUMENTS 9,753,579 B2     9/2017  Johansson et al.  
2010/0283752 A1*  11/2010  Maeda ................ G06F 3/04166  
                                                          345/173

(Continued)

FOREIGN PATENT DOCUMENTS

JP      H05-165598 A      7/1993  
JP      H08-179874 A      7/1996

(Continued)

OTHER PUBLICATIONS

Extended European Search Report issued in corresponding European Patent Application No. EP 22186315.2 dated Jan. 3, 2023 (26 pages).

*Primary Examiner* — Chun-Nan Lin  
(74) *Attorney, Agent, or Firm* — Osha Bergman Watanabe & Burton LLP

(57) ABSTRACT

An information processing apparatus includes a touchscreen display that detects, as a detection position, contact of an object on a screen of the touchscreen display and a processor coupled to the touchscreen display. The processor is programmed to acquire a plurality of first detection positions on the screen, calculate a movement parameter representing a movement of the object during the detection of the plurality of first detection positions, and select based on the movement parameter a first smoothing algorithm or a second smoothing algorithm. The first smoothing algorithm and the second smoothing algorithm are different from each other in a processing delay between detecting a particular detection position and output a smoothed detection position corresponding to that particular detecting position. The touchscreen display displays a movement locus on the screen based on the selected smoothing algorithm.

7 Claims, 10 Drawing Sheets

(56) References Cited

U.S. PATENT DOCUMENTS

| | | | |
|---|---|---|---|
| 2012/0047193 A1* | 2/2012 | Lin | G06F 3/0354 708/445 |
| 2015/0091832 A1 | 4/2015 | Mizunuma et al. | |
| 2017/0060241 A1* | 3/2017 | Matsumoto | G06F 3/0416 |

FOREIGN PATENT DOCUMENTS

| | | |
|---|---|---|
| JP | 2012-185694 A | 9/2012 |
| JP | 2015-203955 A | 11/2015 |
| KR | 10-2021-0078900 A | 6/2021 |

\* cited by examiner

| PEN MOVEMENT SPEED | SPEED MODE | SAMPLE DELAY COUNT | DRAWING QUALITY |
|---|---|---|---|
| $Vt < Vth1$ | LOW-SPEED MODE | 2 | HIGH |
| $Vth \leq Vt < Vth2$ | MEDIUM-SPEED MODE | 1 | MEDIUM |
| $Vt \geq Vth2$ | HIGH-SPEED MODE | 0 | LOW |

APPARATUS, SYSTEM, AND METHOD FOR DATA SMOOTHING

CROSS-REFERENCE TO RELATED APPLICATIONS

This application claims priority to Japanese Patent Application No. 2021-130037 filed Aug. 6, 2021, the contents of which are hereby incorporated herein by reference in their entirety.

TECHNICAL FIELD

The present disclosure relates to an information processing apparatus, an information processing system, and a control method.

BACKGROUND

In recent years, certain information processing apparatuses such as personal computers include an input device that performs handwriting input. For handwriting input by an input device in such information processing apparatuses, there is a technology of performing smoothing processing of reducing noise of detected detection position data to make drawing smooth and thus improve the drawing quality. This technology is subject to improvement.

SUMMARY

In one or more embodiments of the present disclosure, an information processing apparatus includes a touchscreen display that detects, as a detection position, contact of an object on a screen of the touchscreen display, and a processor coupled to the touchscreen display, the processor being programmed to acquire a plurality of first detection positions on the screen, calculate a movement parameter representing movement of the object during detection of the plurality of first detection positions, and select, based on the movement parameter, a first smoothing algorithm or a second smoothing algorithm, the first smoothing algorithm and the second smoothing algorithm differing from each other in a processing delay between detecting a particular detection position and outputting a smoothed detection position corresponding to that particular detecting position, wherein the touchscreen display displays a movement locus on the screen based on the selected smoothing algorithm.

DETAILED DESCRIPTION

An information processing apparatus, an information processing system, and a control method according to embodiments of the present disclosure will be described below, with reference to drawings.

First Embodiment

Figure 1:
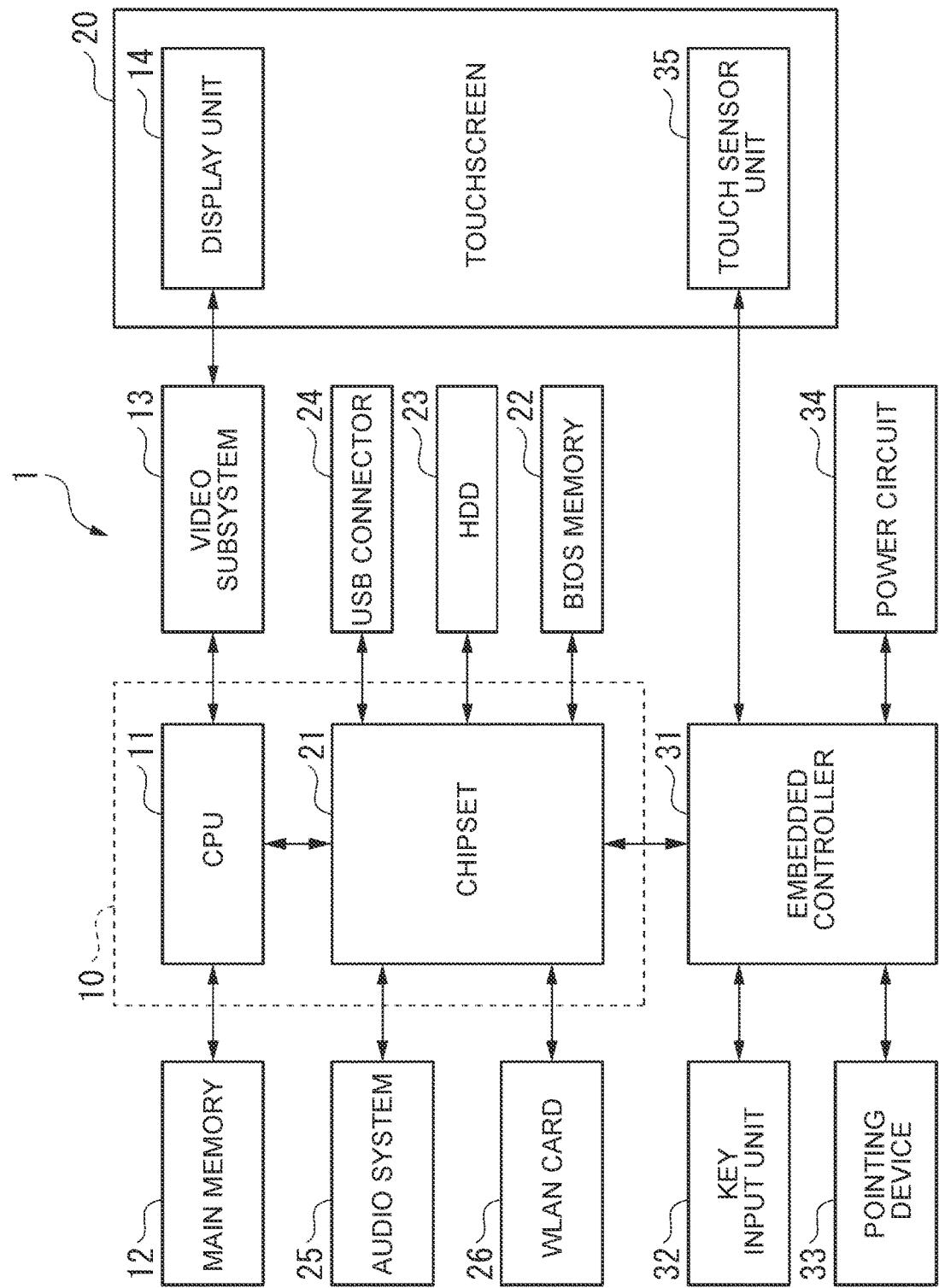
FIG. 1 is a diagram illustrating an example of the main hardware structure of a laptop PC.

FIG. 1 is a diagram illustrating an example of the main hardware structure of a laptop personal computer (PC) 1 according to a first embodiment. This embodiment describes the laptop PC 1 as an example of an information processing apparatus.

As illustrated in FIG. 1, the laptop PC 1 includes a CPU 11, a main memory 12, a video subsystem 13, a display unit 14, a chipset 21, a BIOS memory 22, an HDD 23, a USB connector 24, an audio system 25, a WLAN card 26, an embedded controller 31, a key input unit 32, a pointing device 33, a power circuit 34, and a touch sensor unit 35.

The CPU (Central Processing Unit) 11 performs various arithmetic processing by program control, and controls the overall laptop PC 1.

The main memory 12 is a writable memory used as an area for reading execution programs of the CPU 11 or a work area for writing processed data of the execution programs. For example, the main memory 12 is made up of a plurality of DRAM (Dynamic Random Access Memory) chips. The execution programs include an OS (Operating System), various device drivers for hardware-operating peripherals, various services/utilities, and application programs.

The video subsystem 13 is a subsystem for implementing functions relating to image display, and includes a video controller. The video controller processes a drawing instruction from the CPU 11, and writes the processed drawing information to a video memory. The video controller also reads the drawing information from the video memory, and outputs it to the display unit 14 as drawing data (display data).

The display unit 14 is, for example, a liquid crystal display or an organic electroluminescence (EL) display, and displays, as a main screen of the laptop PC 1, a display screen based on the display data output from the video subsystem 13.

The chipset 21 includes controllers such as USB (Universal Serial Bus), Serial ATA (AT Attachment), SPI (Serial Peripheral Interface) bus, PCI (Peripheral Component Interconnect) bus, PCI-Express bus, and LPC (Low Pin Count) bus, and is connected to a plurality of devices. In FIG. 1, devices such as the BIOS memory 22, the HDD 23, the USB connector 24, the audio system 25, the WLAN card 26, and the embedded controller 31 are connected to the chipset 21.

The BIOS (Basic Input/Output System) memory 22 is, for example, composed of an electrically rewritable non-volatile memory such as electrically erasable programmable read only memory (EEPROM) or flash ROM. The BIOS memory 22 stores the BIOS, system firmware for controlling the embedded controller 31, etc., and the like.

The HDD (Hard Disk Drive) 23 (an example of a non-volatile storage) stores an OS, various drivers, various services/utilities, application programs, and various data.

The USB connector 24 is a connector for connecting peripherals using USB.

The audio system 25 records, reproduces, and outputs sound data.

The WLAN (Wireless Local Area Network) card 26 connects to a network by wireless LAN and performs data communication.

The embedded controller 31 (an example of an embedded control unit) is a one-chip microcomputer that monitors and controls each device (peripherals, sensors, etc.) regardless of the system state of the laptop PC 1. The embedded controller 31 also has a power management function of controlling the power circuit 34. The embedded controller 31 is composed of a CPU, a ROM, a RAM, and the like (not illustrated), and includes A/D input terminals, D/A output terminals, timers, and digital input and output terminals of a plurality of channels. The embedded controller 31 is connected to the key input unit 32, the pointing device 33, the power circuit 34, the touch sensor unit 35, and the like via these input and output terminals, and controls their operations.

The key input unit 32 is an input device such as a keyboard or a touch panel, and receives key input from a user. The pointing device 33 is an input device such as a mouse or a touch pad, and mainly receives designation of a position on a display screen, designation or selection of an operation target (object) such as an operation button, and the like.

The power circuit 34 includes, for example, a DC/DC converter, a charge/discharge unit, a battery unit, and an AC/DC adapter, and converts a DC voltage supplied from the AC/DC adapter or the battery unit into a plurality of voltages necessary to operate the laptop PC 1. The power circuit 34 supplies power to each unit in the laptop PC 1, based on control by the embedded controller 31.

In this embodiment, the CPU 11 and the chipset 21 correspond to a main control unit 10. The main control unit 10 performs processes based on an OS (for example, Windows®).

The display unit 14 and the touch sensor unit 35 correspond to a touchscreen 20. For example, the touch sensor unit 35 is an input device such as a touch panel, and is overlaid with the display unit 14. The touch sensor unit 35 is located on the screen of the display unit 14, and detects contact (i.e. touch) of an object on the screen of the display unit 14. For example, as a result of an operation medium such as a pen contacting (i.e. touching) the screen of the display unit 14, the touch sensor unit 35 detects detection position data indicating the position on the screen of the display unit 14 and the contact pressure at which the operation medium contacts the screen.

Figure 2:
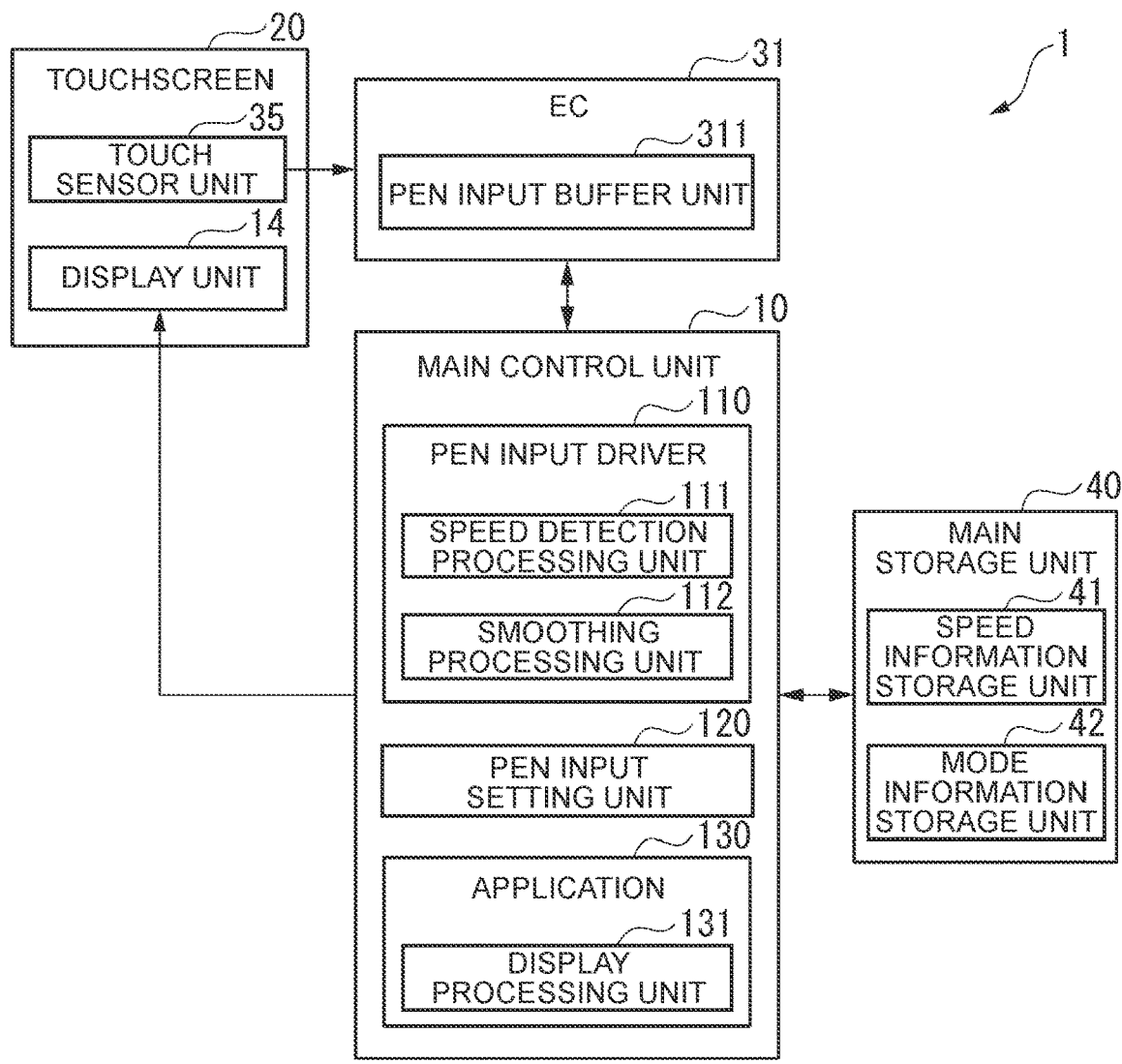
FIG. 2 is a block diagram illustrating an example of the functional structure of the laptop PC.

The functional structure of the laptop PC 1 according to this embodiment will be described below, with reference to FIG. 2. FIG. 2 is a block diagram illustrating an example of the functional structure of the laptop PC 1 according to this embodiment.

As illustrated in FIG. 2, the laptop PC 1 includes the main control unit 10, the touchscreen 20, the embedded controller (EC) 31, and a main storage unit 40. FIG. 2 illustrates only the main functional structure of the laptop PC 1 relating to this embodiment.

The main storage unit 40 is a storage unit implemented by the main memory 12, the HDD 23, or the like, and stores various information used by the laptop PC 1. For example, the main storage unit 40 stores work data used for processing by the below-described pen input driver 110 or application 130, setting information of the below-described pen input setting unit 120, and the like. The main storage unit 40 includes a speed information storage unit 41 and a mode information storage unit 42.

The speed information storage unit 41 is, for example, a storage unit implemented by the main memory 12, and stores the movement speed of the operation medium such as a pen. Herein, the movement speed is the average movement speed in units of groups each made up of a predetermined number of samples. The movement speed of the operation medium such as a pen will be described in detail later.

The mode information storage unit 42 is, for example, a storage unit implemented by the main memory 12, and stores mode information indicating a speed mode of smoothing processing (described later). Speed modes of smoothing processing include a low-speed mode, a medium-speed mode, and a high-speed mode. The mode information storage unit 42 stores mode information indicating one of the low-speed mode, the medium-speed mode, and the high-speed mode. The speed modes will be described in detail later.

The embedded controller 31 is an embedded control unit different from the main control unit 10. The embedded controller 31 acquires a plurality of pieces of detection position data (first detection position data) on the screen detected at predetermined detection intervals by the touch sensor unit 35 as a result of the operation medium such as a pen contacting the screen of the display unit 14, and stores the acquired plurality of pieces of detection position data in a pen input buffer unit 311. Moreover, in response to a request by the pen input driver 110 in the main control unit 10 (described later), the embedded controller 31 outputs the detection position data (first detection position data) stored in the pen input buffer unit 311 to the pen input driver 110.

The embedded controller 31 includes the pen input buffer unit 311.

The pen input buffer unit 311 is, for example, implemented by a RAM in the embedded controller 31, and stores, in chronological order, a plurality of pieces of detection position data detected at predetermined detection intervals by the touch sensor unit 35 in the touchscreen 20. For example, the pen input buffer unit 311 stores two-dimensional coordinate data on the screen of the display unit 14, which is detection position data, and contact pressure in association with each other.

The main control unit 10 is a functional unit implemented by the CPU 11 and the chipset 21 executing a program stored in the main memory 12, and executes various processes based on the OS. For example, the main control unit 10 causes the display unit 14 to display a movement locus on the screen as a result of the operation medium such as a pen moving in contact with the screen, based on detection position data output from the embedded controller 31. The main control unit 10 includes the pen input driver 110, the pen input setting unit 120, and the application 130.

The pen input driver 110 (an example of an input processing unit) is a functional unit implemented by the CPU 11 and the chipset 21, and controls a pen input process (handwriting input process) by the touchscreen 20. The pen input driver 110 acquires, from the embedded controller 31, detection position data (first detection position data) on the screen of the display unit 14 detected by the touch sensor unit 35, and outputs the detection position data to the application 130. For example, the pen input driver 110 is a device driver added to the OS (for example, Windows®).

The pen input driver 110 executes smoothing processing based on detection position data (first detection position data) of a plurality of samples on the screen detected at predetermined detection intervals by the touch sensor unit 35, and outputs detection position data (second detection position data) as a result of the smoothing processing. Herein, the smoothing processing is a filtering process of smoothing a drawn movement locus by noise reduction. The smoothing processing causes a delay (processing delay) of a predetermined number of samples depending on the noise reduction performance (drawing quality). The processing delay in the smoothing processing will be described below, with reference to FIG. 3.

Figure 3:
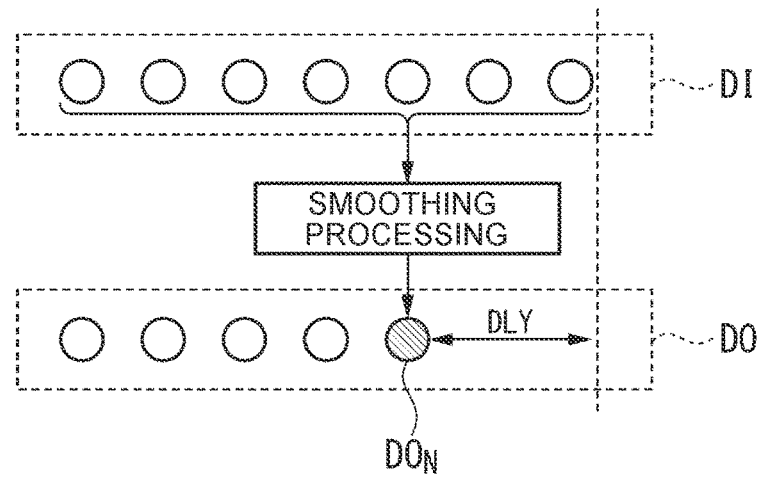
FIG. 3 is a diagram illustrating an example of processing delay in smoothing processing.

FIG. 3 is a diagram illustrating an example of processing delay in smoothing processing in this embodiment.

As illustrated in FIG. 3, the pen input driver 110 smoothing-processes detection position data DI (first detection position data) of a predetermined number of samples detected by the touch sensor unit 35, to generate the Nth detection position data DON (second detection position data) after the smoothing processing. As illustrated in FIG. 3, the pen input driver 110 performs a smoothing process on a predetermined number of samples of detection position data DI (first detection position data), which is detected by the touch sensor unit 35, to generate an Nth smoothed detection position data DON (second detection position data). In the illustrated example, a delay DLY of two samples occurs between generating the smoothed detection position data DON and the detection of the predetermined number of samples of detection position data DI used to generated the smoothed detection position data DON.

The pen input driver 110 selectively executes smoothing processing different in processing performance and processing delay amount, depending on the status of drawing according to detection position data. Examples of the status of drawing include the movement speed of the pen (for example, average speed according to a plurality of pieces of detection position data), the change in movement speed (for example, movement acceleration), the change in movement angle on the screen, and the drawing shape (curve, straight line, letter, etc.). The status of drawing may be a movement parameter or a drawing shape (curve, straight line, letter, etc.). The movement parameter is a parameter representing the movement of the operation medium such as a pen during detection of a plurality of pieces of detection position data (first detection position data), i.e. a parameter relating to the movement of the operation medium. Examples of the movement parameter include the movement speed of the pen (for example, average speed according to a plurality of pieces of detection position data), the change in movement speed (for example, movement acceleration), the change in movement angle on the screen, and the drawing shape (curve, straight line, letter, etc.).

For example, the pen input driver 110 selectively executes smoothing processing different in sample delay count (i.e. the number of samples delayed), depending on the movement speed of the pen (i.e. the movement speed of the operation medium on the screen). The pen input driver 110 executes, for example, an acquisition process, a calculation process, and a selection process. As the acquisition process, the pen input driver 110 acquires a plurality of pieces of detection position data (first detection position data) detected at predetermined detection intervals by the touch sensor unit 35. As the calculation process, the pen input driver 110 calculates a movement parameter based on the plurality of pieces of detection position data (first detection position data). As the selection process, the pen input driver 110 selects, based on the movement parameter, an algorithm of specific smoothing processing from algorithms of a plurality of types of smoothing processing that are each a process of smoothing a drawn movement locus by noise reduction and differ in processing delay amount indicating the delay between specific detection position data (first detection position data) detected and detection position data (second detection position data) resulting from smoothing-processing the specific detection position data, and executes the algorithm.

The pen input driver 110 includes a speed detection processing unit 111 and a smoothing processing unit 112.

The speed detection processing unit 111 is a functional unit implemented by the CPU 11 and the chipset 21 executing a program stored in the main memory 12, and executes a process of detecting the movement speed of the operation medium such as a pen on the screen of the display unit 14.

Figures 4, 5:
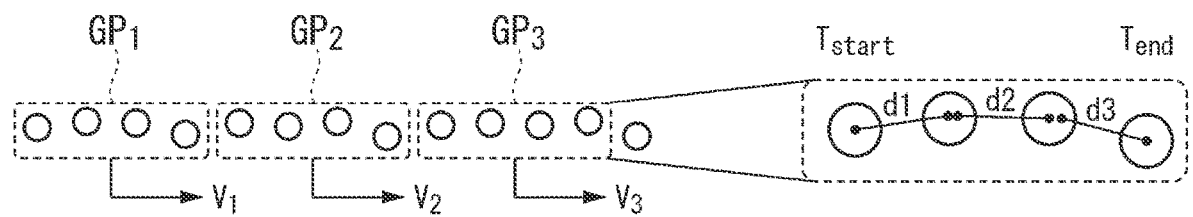
FIG. 4 is a diagram illustrating an example of generating the movement speed of a pen.
FIG. 5 is a diagram illustrating an example of speed modes of smoothing processing.

For example, as illustrated in FIG. 4, the speed detection processing unit 111 groups detection position data (first detection position data) in units of a predetermined number of samples (for example, four samples), and generates the average movement speed in each group ($GP_1$, $GP_2$, and $GP_3$) as the movement speed of the pen. Let the distances between adjacent ones of the four samples be distance d1, distance d2, and distance d3. Then, the movement speed Vt in sample T is represented by the following formula (1).

$$Vt = \frac{d1 + d2 + d3}{Tend - Tstart} \qquad (1)$$

Here, variable Tstart is the detection time of the first sample, and variable Tend is the detection time of the fourth sample. Accordingly, (Tend−Tstart) is the time interval for detecting the detection position data of the group of four samples, and corresponds to (sample time interval×3).

Using the foregoing formula (1), the speed detection processing unit 111 generates the movement speed Vt in each group (i.e. in units of the predetermined number of samples), and stores the generated movement speed Vt in the speed information storage unit 41.

The smoothing processing unit 112 is a functional unit implemented by the CPU 11 and the chipset 21 executing a program stored in the main memory 12, and executes different smoothing processing depending on the movement speed Vt. The smoothing processing unit 112 selects, depending on the movement speed Vt, smoothing processing of one of two speed modes that differ in sample delay count and drawing quality (processing performance), and executes the smoothing processing. An example of movement speeds Vt and speed modes will be described below, with reference to FIG. 5.

FIG. 5 is a diagram illustrating an example of speed modes of smoothing processing in this embodiment.

In FIG. 5, "pen movement speed" indicates the range of the movement speed Vt of the pen, "speed mode" indicates the speed mode corresponding to the range of the movement speed Vt, and "sample delay count" and "drawing quality" respectively indicate the sample delay count and the drawing quality in the speed mode.

In the example illustrated in FIG. 5, in the case where the movement speed Vt is less than predetermined threshold Vth1 (Vt<Vth1), the smoothing processing unit 112 executes smoothing processing in the low-speed mode. The smoothing processing in the low-speed mode has sample delay count "2" and drawing quality "high".

In the case where the movement speed Vt is not less than predetermined threshold Vth1 and is less than predetermined threshold Vth2 (Vth1≤Vt<Vth2), the smoothing processing unit 112 executes smoothing processing in the medium-speed mode. Threshold Vth2 is greater than threshold Vth1. The smoothing processing in the medium-speed mode has sample delay count "1" and drawing quality "medium".

In the case where the movement speed Vt is not less than predetermined threshold Vth2 (Vth2≤Vt), the smoothing processing unit 112 executes smoothing processing in the high-speed mode. The smoothing processing in the high-speed mode has sample delay count "0" and drawing quality "low".

The smoothing processing unit 112 acquires the movement speed Vt stored in the speed information storage unit 41, determines which pen movement speed range in FIG. 5 the acquired movement speed Vt corresponds to, and decides the corresponding speed mode. The smoothing processing unit 112 stores mode information indicating the decided speed mode, in the mode information storage unit 42. The smoothing processing unit 112 executes this speed mode change process each time the movement speed Vt is generated. That is, the smoothing processing unit 112 executes the speed mode change process for each group of detection position data (i.e. in units of the predetermined number of samples, for example, in units of four samples).

Each time the smoothing processing unit 112 acquires a sample of detection position data (first detection position data) from the pen input buffer unit 311, the smoothing processing unit 112 acquires the mode information stored in the mode information storage unit 42, and executes smoothing processing corresponding to the speed mode indicated by the acquired mode information. That is, the smoothing processing unit 112 generates (calculates) the movement speed in units of the predetermined number of samples of a plurality of pieces of detection position data (first detection position data), and switches smoothing processing (algorithm) different in sample delay count in units of the predetermined number of samples. The smoothing processing unit 112 outputs detection position data (second detection position data) as a result of the smoothing processing to the application 130, for example, through the OS.

When the smoothing processing unit 112 changes the speed mode, the smoothing processing unit 112 provides a transition period of a predetermined number of samples. A speed mode up change process (i.e. speed mode raising process) from the low-speed mode (first smoothing processing) to the medium-speed mode (second smoothing processing) will be described in detail below, with reference to FIG. 6.

Figure 6:
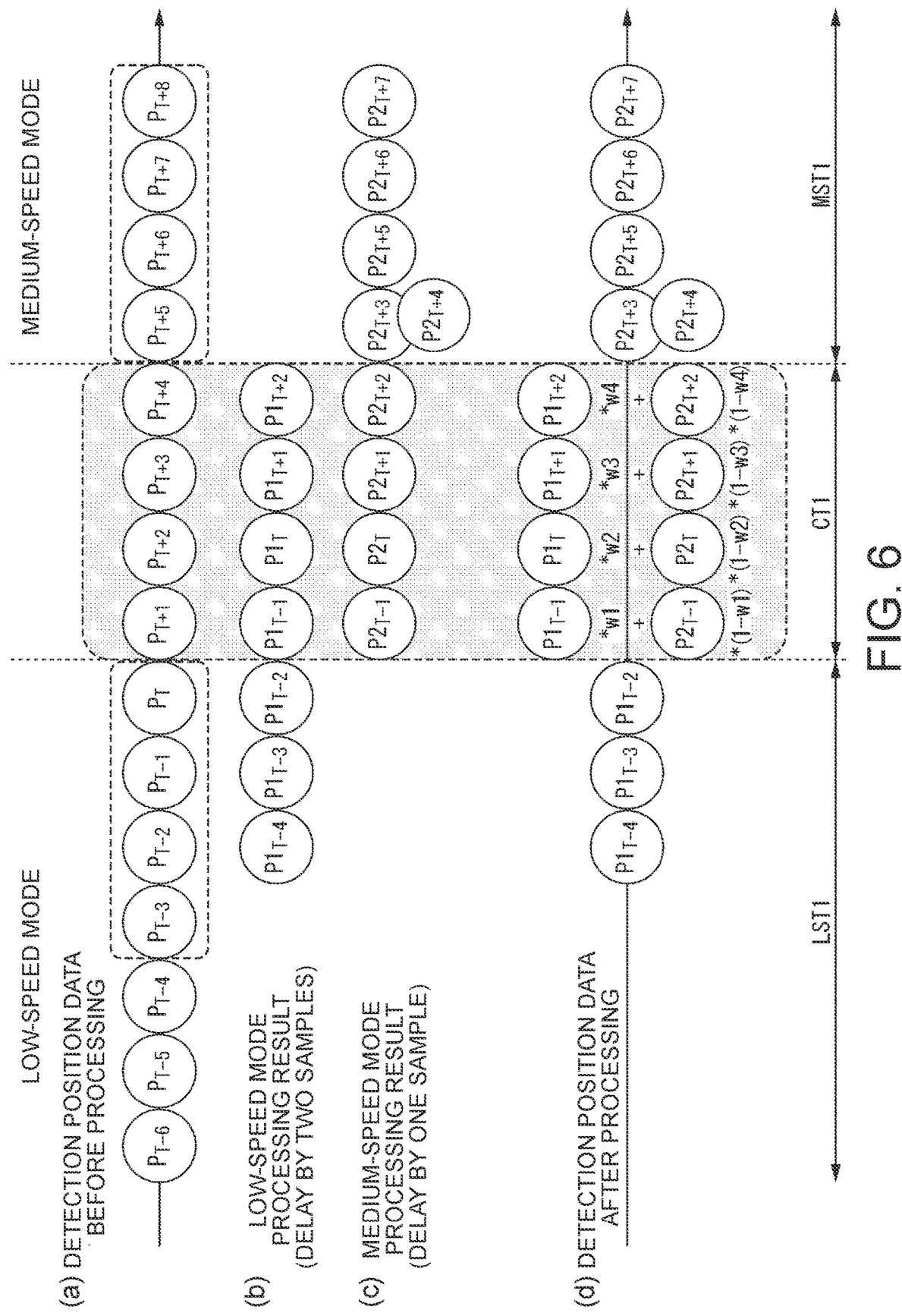
FIG. 6 is a diagram illustrating an example of a speed mode up change process.

FIG. 6 is a diagram illustrating an example of the speed mode up change process in this embodiment. FIG. 6 illustrates (a) detection position data before processing (first detection position data), (b) low-speed mode processing result, (c) medium-speed mode processing result, and (d) detection position data after processing (second detection position data) in this order from above. Each circle represents a sample.

In FIG. 6, the smoothing processing in the low-speed mode has sample delay count "2", and the smoothing processing in the medium-speed mode has sample delay count "1".

In the speed mode up change process, the smoothing processing unit 112 provides transition period CT1 of the same number of samples (four samples) as the number of samples of each group.

First, in period LST1 in the low-speed mode, the smoothing processing unit 112 outputs (b) low-speed mode processing result as (d) detection position data after processing.

In transition period CT1, the smoothing processing unit 112 outputs the weighted average of (b) low-speed mode processing result and (c) medium-speed mode processing result as (d) detection position data after processing. Detection position data $PO_T$ after processing in sample T in this case is represented by the following formula (2).

$$PO_T = w \cdot P1_T + (1-w) \cdot P2_T \qquad (2)$$

Here, detection position data $P1_T$ is the low-speed mode processing result, and detection position data $P2_T$ is the medium-speed mode processing result. Variable w indicates a weighting parameter, and is a value in a range of 0 to 1.

In transition period CT1, the smoothing processing unit 112 generates the weighted average of the low-speed mode processing result and the medium-speed mode processing result as detection position data $PO_T$ after processing, using the foregoing formula (2). Here, as the transition progresses, the smoothing processing unit 112 changes weight w from 1 to 0, and outputs the weighted average with the weight of the medium-speed mode being increased, as detection position data $PO_T$ as a result of the smoothing processing.

Next, in period MST1 in the medium-speed mode after the transition, the smoothing processing unit 112 outputs (c) medium-speed mode processing result as (d) detection position data after processing. The detection position data immediately after the end of transition period CT1 has two values (sample $P2_{T+3}$ and sample $P2_{T+4}$ illustrated in FIG. 6), because the sample delay count decreases. The smoothing processing unit 112 may output one of the two samples or the average of the two samples as (d) detection position data after processing.

A speed mode down change process (i.e. speed mode lowering process) from the medium-speed mode (second smoothing processing) to the low-speed mode (first smoothing processing) will be described in detail below, with reference to FIG. 7.

Figure 7:
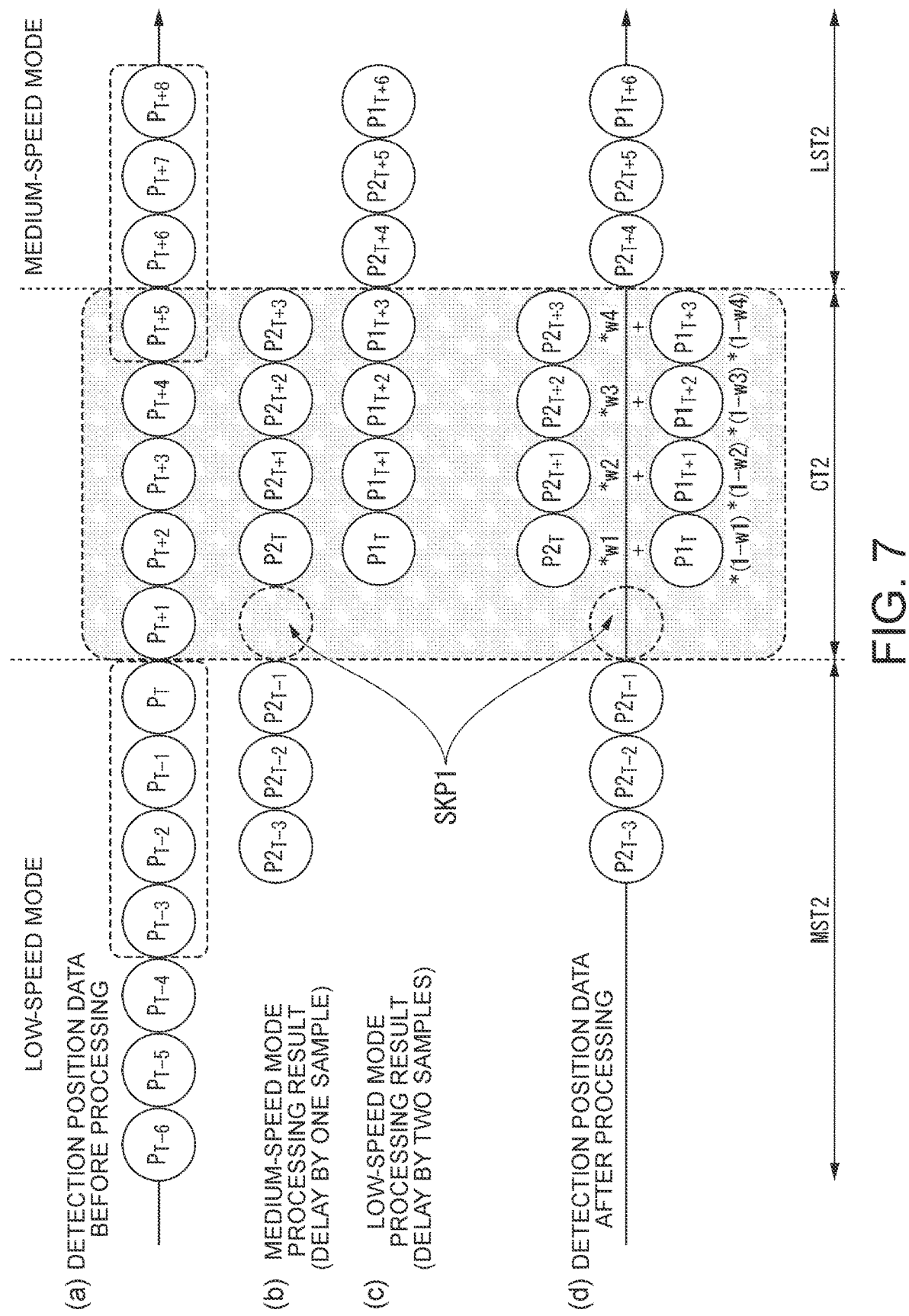
FIG. 7 is a diagram illustrating an example of a speed mode down change process.

FIG. 7 is a diagram illustrating an example of the speed mode down change process in this embodiment. FIG. 7 illustrates (a) detection position data before processing, (b) medium-speed mode processing result, (c) low-speed mode processing result, and (d) detection position data after processing in this order from above. Each circle represents a sample.

In FIG. 7, the smoothing processing in the low-speed mode has sample delay count "2", and the smoothing processing in the medium-speed mode has sample delay count "1", as in FIG. 6.

In the speed mode down change process, the smoothing processing unit 112 provides transition period CT2 of the number of samples of each group+1 (i.e. five samples).

First, in period MST2 in the medium-speed mode, the smoothing processing unit 112 outputs (b) medium-speed mode processing result as (d) detection position data after processing.

In transition period CT2, the smoothing processing unit 112 outputs the weighted average of (b) medium-speed mode processing result and (c) low-speed mode processing result as (d) detection position data after processing. Detection position data $PO_T$ after processing in sample T in this case is represented by the following formula (3).

$$PO_T = w \cdot P2_T + (1-w) \cdot P1_T \qquad (3)$$

Here, detection position data $P1_T$ is the low-speed mode processing result, and detection position data $P2_T$ is the medium-speed mode processing result. Variable w indicates a weighting parameter, and is a value in a range of 0 to 1.

In transition period CT2, the smoothing processing unit 112 generates the weighted average of the low-speed mode processing result and the medium-speed mode processing result as detection position data $PO_T$ after processing, using the foregoing formula (3). Here, as the transition progresses, the smoothing processing unit 112 changes weight w from 0 to 1, and outputs the weighted average with the weight of the low-speed mode being increased, as detection position data $PO_T$ as a result of the smoothing processing.

Since the sample delay count increases in the smoothing processing in the low-speed mode as compared with the medium-speed mode, skip sample STP1 is provided in transition period CT2 as illustrated in FIG. 7. The smoothing processing unit 112 does not output detection position data $PO_T$ in the first sample of transition period CT2, as skip sample STP1. Alternatively, in skip sample STP1, the smoothing processing unit 112 may output (b) medium-speed mode processing result as (d) detection position data after processing.

Next, in period LST2 in the low-speed mode after the transition, the smoothing processing unit 112 outputs (c) low-speed mode processing result as (d) detection position data after processing.

Referring back to FIG. 2, the pen input setting unit 120 is a functional unit implemented by the CPU 11 and the chipset 21. The pen input setting unit 120, for example, forcefully changes the speed mode in response to a change request from the user.

The application 130 is a functional unit implemented by the CPU 11 and the chipset 21. The application 130 is an application executed on the OS. For example, the application 130 is an application of executing a pen input process (handwriting input process) using the touchscreen 20.

The application 130 acquires detection position data of the display unit 14 output from the embedded controller 31 via the pen input driver 110, and, based on the acquired detection position data, causes the display unit 14 to display the movement locus on the screen as a result of the operation medium such as a pen moving in contact with the screen. The application 130 includes a display processing unit 131.

The display processing unit 131 causes the display unit 14 to display a movement locus on the screen as a result of the operation medium such as a pen moving in contact with the screen, based on the detection position data output from the pen input driver 110.

The operation of the laptop PC 1 according to this embodiment will be described below, with reference to drawings.

Figure 8:
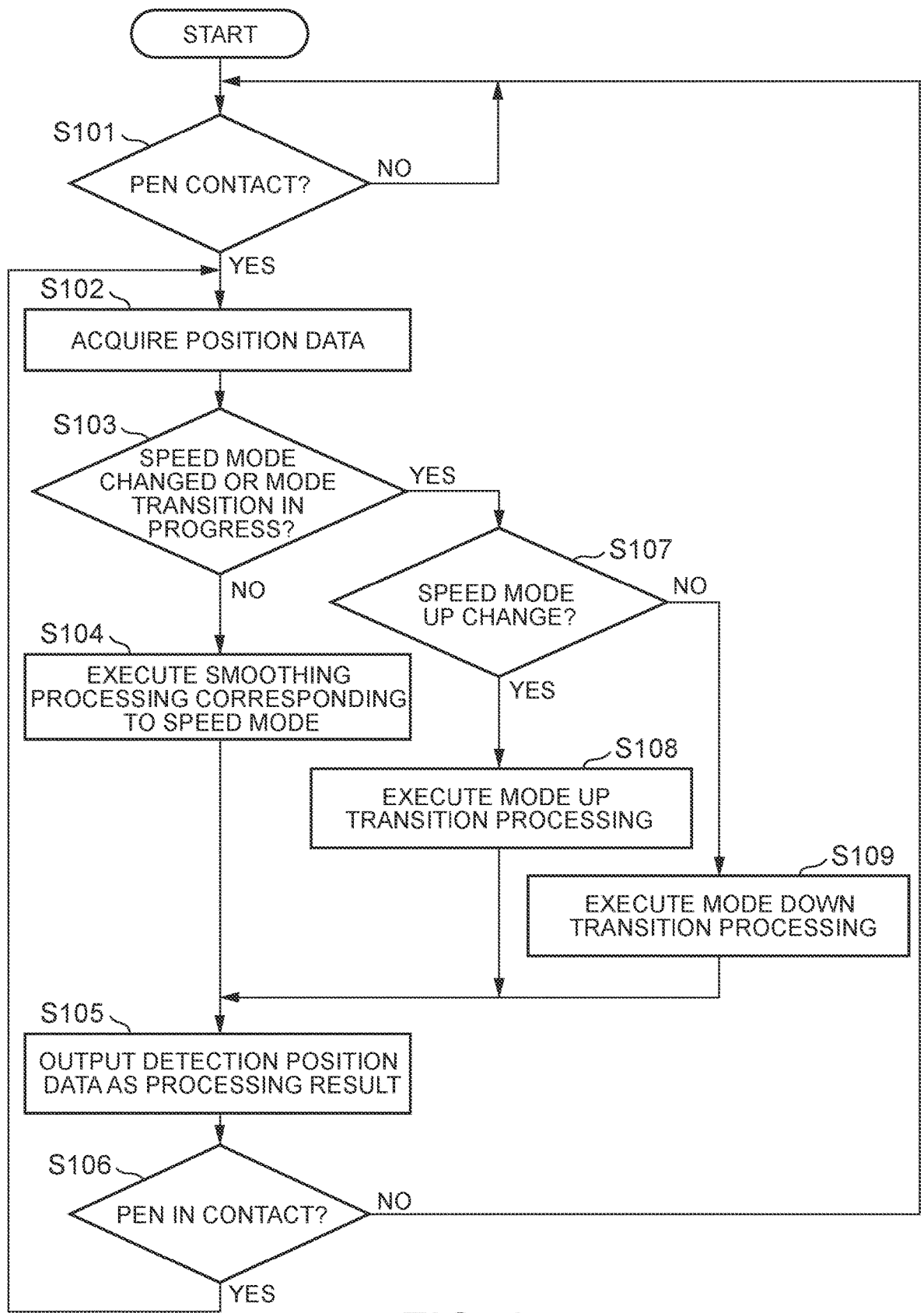
FIG. 8 is a flowchart illustrating an example of a pen input process of the laptop PC.

FIG. 8 is a flowchart illustrating an example of a pen input process of the laptop PC 1 according to this embodiment.

As illustrated in FIG. 8, first, the laptop PC 1 determines whether a pen contacts the screen of the display unit 14 (i.e. the panel of the touch sensor unit 35) (step S101). The embedded controller 31 in the laptop PC 1 determines whether the pen contacts the touch sensor unit 35. In the case where the pen contacts the touch sensor unit 35 (step S101: YES), the embedded controller 31 advances the process to step S102. In the case where the pen does not contact the touch sensor unit 35 (step S101: NO), the embedded controller 31 returns the process to step S101.

In step S102, the embedded controller 31 acquires position data. The embedded controller 31 acquires detection position data detected by the touch sensor unit 35, and stores the detection position data in the pen input buffer unit 311. The embedded controller 31 also outputs event information indicating that the detection position data is detected by the touch sensor unit 35, to the pen input driver 110 in the main control unit 10.

Next, the pen input driver 110 in the laptop PC 1 determines whether the speed mode is changed or mode transition is in progress (i.e. a change in mode is being performed) (step S103). The smoothing processing unit 112 in the pen input driver 110 acquires mode information in the mode information storage unit 42 and determines whether there is a change from the previous mode, or references, for example, flag information indicating whether mode transition is in progress (not illustrated) and determines whether mode transition is in progress. In the case where the speed mode is changed or mode transition is in progress (step S103: YES), the smoothing processing unit 112 advances the process to step S107. In the case where the speed mode is not changed and mode transition is not in progress (step S103: NO), the smoothing processing unit 112 advances the process to step S104.

In step S104, the smoothing processing unit 112 executes smoothing processing corresponding to the speed mode. That is, the smoothing processing unit 112 executes smoothing processing corresponding to the speed mode indicated by the acquired mode information. For example, the smoothing processing unit 112 executes smoothing processing corresponding to one of the low-speed mode, the medium-speed mode, and the high-speed mode illustrated in FIG. 5, depending on the movement speed of the pen.

The smoothing processing unit 112 then outputs detection position data as the processing result (step S105). In detail, the smoothing processing unit 112 in the pen input driver 110 outputs the detection position data as the processing result to the application 130 through the OS.

Next, the pen input driver 110 determines whether the pen is in contact with the screen (step S106). In the case where the pen is in contact with the screen (step S106: YES), the pen input driver 110 returns the process to step S102, and processes the next sample. In the case where the pen is not in contact with the screen (step S106: NO), the pen input driver 110 returns the process to step S101.

In step S107, the smoothing processing unit 112 determines whether the change is a speed mode up change. In the case where the change is a speed mode up change (step S107: YES), the smoothing processing unit 112 advances the process to step S108. In the case where the change is not a speed mode up change (i.e. the change is a sped mode down change) (step S107: NO), the smoothing processing unit 112 advances the process to step S109.

In step S108, the smoothing processing unit 112 executes mode up transition processing. The smoothing processing unit 112 executes the speed mode up change process illustrated in FIG. 6 as an example. The smoothing processing unit 112 provides a transition period, and, in the transition period, generates a weighted average as detection position data after processing using the foregoing formula (2). Here, as the transition progresses, the smoothing processing unit 112 changes weight w from 1 to 0, and generates the weighted average with the weight of the speed mode after the transition being increased. After step S108, the smoothing processing unit 112 advances the process to step S105.

In step S109, the smoothing processing unit 112 executes mode down transition processing. The smoothing processing unit 112 executes the speed mode down change process illustrated in FIG. 7 as an example. The smoothing processing unit 112 provides a transition period, and, in the transition period, generates a weighted average as detection position data after processing using the foregoing formula (3). Here, as the transition progresses, the smoothing processing unit 112 changes weight w from 1 to 0, and generates the weighted average with the weight of the speed mode after the transition being increased. After step S109, the smoothing processing unit 112 advances the process to step S105.

A speed mode change process of the laptop PC 1 according to this embodiment will be described below, with reference to FIG. 9.

Figure 9:
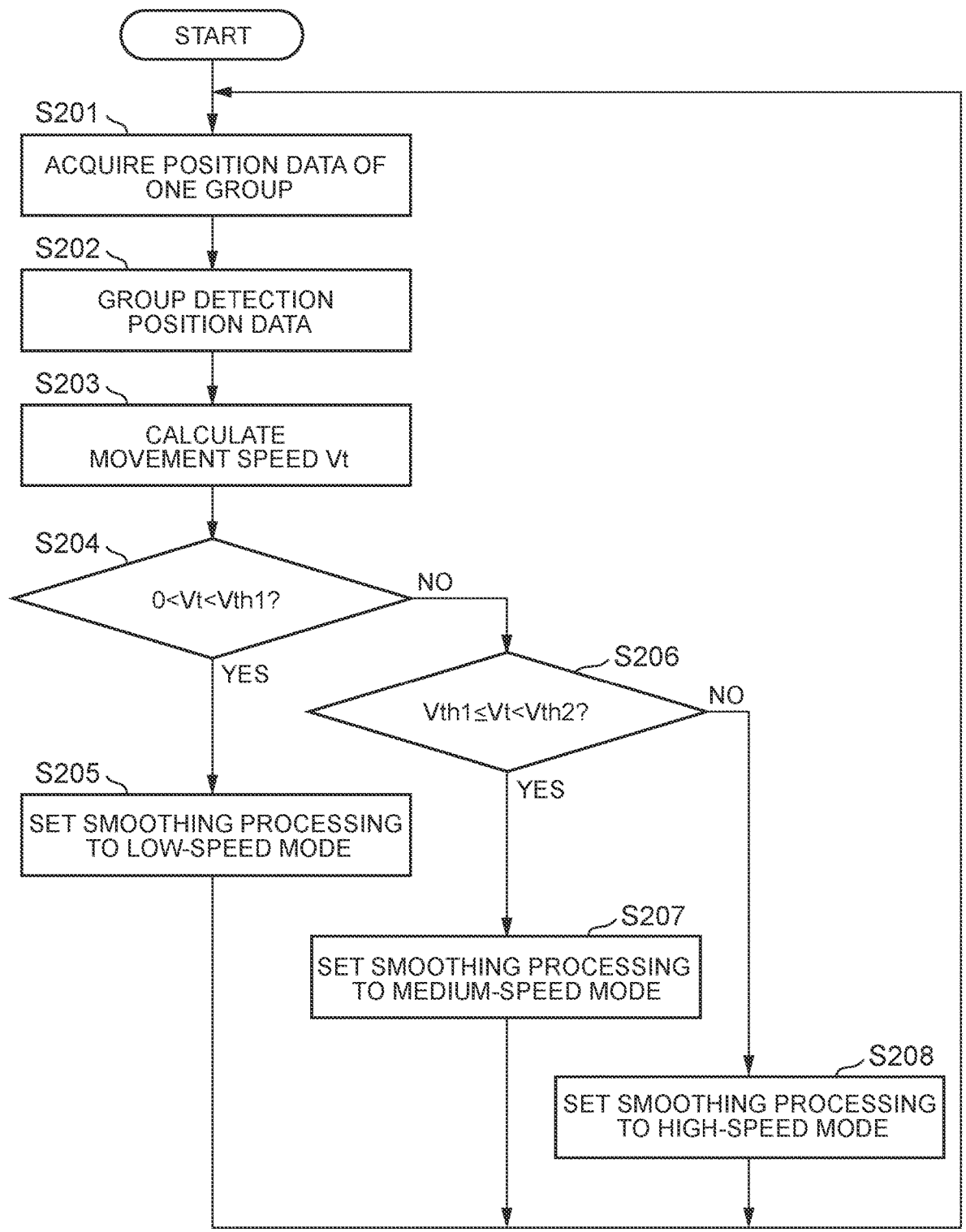
FIG. 9 is a flowchart illustrating an example of a speed mode change process of the laptop PC.

FIG. 9 is a flowchart illustrating an example of the speed mode change process of the laptop PC 1 according to this embodiment.

As illustrated in FIG. 9, first, the pen input driver 110 in the laptop PC 1 acquires position data of one group (step S201). For example, the pen input driver 110 acquires detection position data of four samples from the pen input buffer unit 311.

The pen input driver 110 then groups the detection position data (step S202). The speed detection processing unit 111 in the pen input driver 110 sets the acquired detection position data of four samples as one group.

The speed detection processing unit 111 then calculates the movement speed Vt (step S203). For example, the speed detection processing unit 111 calculates the average movement speed Vt in the group of four samples using the foregoing formula (1). The speed detection processing unit 111 stores the calculated movement speed Vt in the speed information storage unit 41.

Next, the smoothing processing unit 112 in the pen input driver 110 determines whether the movement speed Vt is in a range between 0 and threshold Vth1 (0<Vt<Vth1) (step S204). In the case where the movement speed Vt is less than threshold Vth1 (step S204: YES), the smoothing processing unit 112 advances the process to step S205. In the case where the movement speed Vt is not less than threshold Vth1 (step S204: NO), the smoothing processing unit 112 advances the process to step S206.

In step S205, the smoothing processing unit 112 sets smoothing processing to the low-speed mode. The smoothing processing unit 112 stores mode information indicating the low-speed mode in the mode information storage unit 42, to set the low-speed mode. After step S205, the smoothing processing unit 112 returns the process to step S201.

In step S206, the smoothing processing unit 112 determines whether the movement speed Vt is not less than threshold Vth1 and is less than threshold Vth2 (Vth1≤Vt<Vth2). In the case where the movement speed Vt is not less than threshold Vth1 and is less than threshold Vth2 (step S206: YES), the smoothing processing unit 112 advances the process to step S207. In the case where the movement speed Vt is not less than threshold Vth2 (step S206: NO), the smoothing processing unit 112 advances the process to step S208.

In step S207, the smoothing processing unit 112 sets smoothing processing to the medium-speed mode. The smoothing processing unit 112 stores mode information indicating the medium-speed mode in the mode information storage unit 42, to set the medium-speed mode. After step S207, the smoothing processing unit 112 returns the process to step S201.

In step S208, the smoothing processing unit 112 sets smoothing processing to the high-speed mode. The smoothing processing unit 112 stores mode information indicating the high-speed mode in the mode information storage unit 42, to set the high-speed mode. After step S208, the smoothing processing unit 112 returns the process to step S201.

A modification of the speed mode change process of the laptop PC 1 according to this embodiment will be described below, with reference to FIG. 10.

Figure 10:
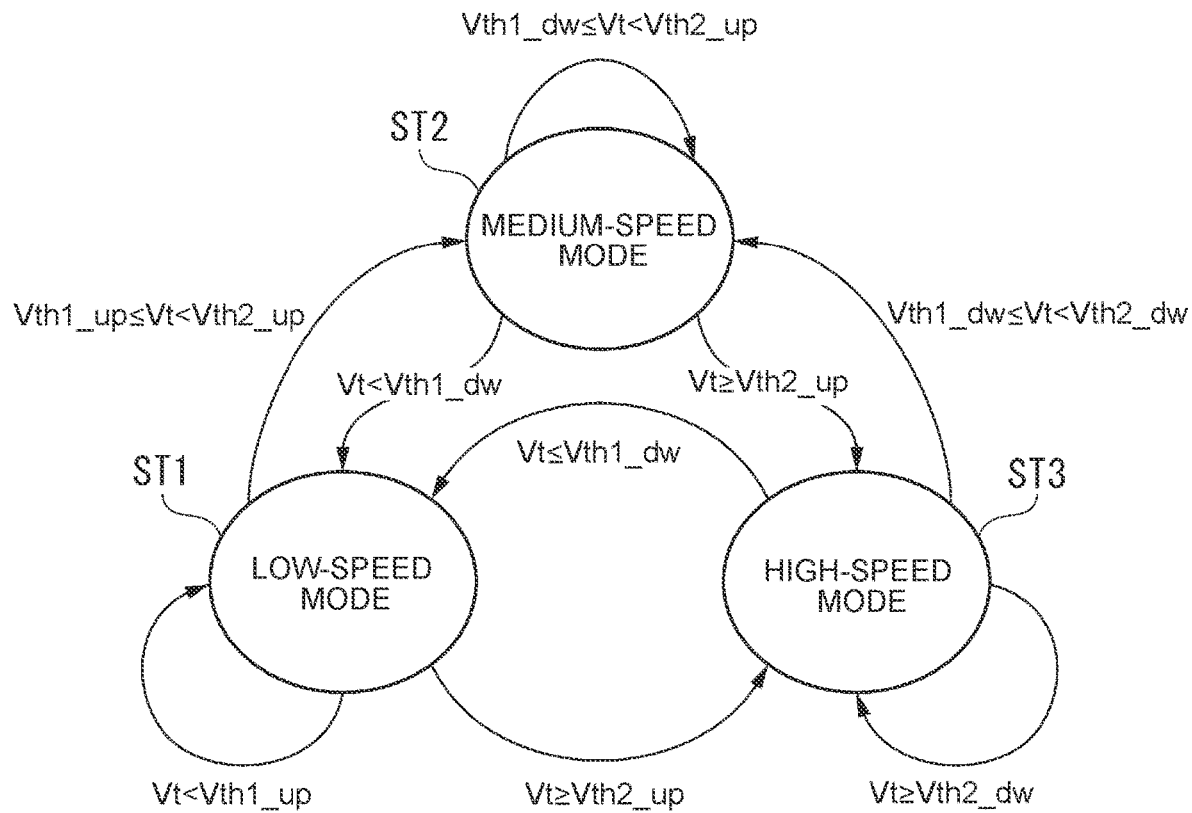
FIG. 10 is a diagram illustrating a modification of the speed mode change process of the laptop PC.

FIG. 10 is a diagram illustrating a modification of the speed mode change process of the laptop PC 1 according to this embodiment.

In the modification illustrated in FIG. 10, the thresholds used are different between a speed mode up change process and a speed mode down change process.

FIG. 10 illustrates a state machine for the speed mode change process.

In FIG. 10, in an up change process of changing from low-speed mode ST1 to medium-speed mode ST2, the smoothing processing unit 112 changes the speed mode from low-speed mode ST1 to medium-speed mode ST2 in the case where the movement speed Vt is not less than threshold Vth1_up (first threshold). In a down change process of changing from medium-speed mode ST2 to low-speed mode ST1, the smoothing processing unit 112 changes the speed mode from medium-speed mode ST2 to low-speed mode ST1 in the case where the movement speed Vt is less than threshold Vth1_dw (second threshold). Threshold Vth1_up (first threshold) is greater than threshold Vth1_dw (second threshold).

In an up change process of changing from medium-speed mode ST2 to high-speed mode ST3, the smoothing processing unit 112 changes the speed mode from medium-speed mode ST2 to high-speed mode ST3 in the case where the movement speed Vt is not less than threshold Vth2_up (first threshold). In a down change process of changing from high-speed mode ST3 to medium-speed mode ST2, the smoothing processing unit 112 changes the speed mode from high-speed mode ST3 to medium-speed mode ST2 in the case where the movement speed Vt is less than threshold Vth2_dw (second threshold). Threshold Vth2_up (first threshold) is greater than threshold Vth2_dw (second threshold).

Thus, the smoothing processing unit 112 may change the speed mode using the state machine illustrated in FIG. 10. The smoothing processing unit 112 stores mode information indicating the speed mode changed using the state machine, in the mode information storage unit 42.

As described above, the laptop PC 1 (information processing apparatus) according to this embodiment includes the display unit 14, the touch sensor unit 35, the pen input driver 110 (input processing unit), and the display processing unit 131. The touch sensor unit 35 is located on the screen of the display unit 14, and detects contact of an object on the screen. The pen input driver 110 executes smoothing processing, and outputs detection position data (second detection position data) as a result of the smoothing processing. The smoothing processing is a process of smoothing a drawn movement locus by noise reduction based on detection position data (first detection position data) of a plurality of samples on the screen detected at predetermined detection intervals by the touch sensor unit 35 as a result of an operation medium such as a pen contacting the screen. The pen input driver 110 selectively executes smoothing processing different in processing performance and processing delay amount, depending on the status of drawing (for example, the movement speed of the pen) according to the detection position data (first detection position data). The pen input driver 110 executes, for example, an acquisition process, a calculation process, and a selection process. As the acquisition process, the pen input driver 110 acquires a plurality of pieces of detection position data (first detection position data) detected at predetermined detection intervals by the touch sensor unit 35. As the calculation process, the pen input driver 110 calculates a movement parameter based on the plurality of pieces of detection position data (first detection position data). As the selection process, the pen input driver 110 selects, based on the movement parameter, an algorithm of specific smoothing processing from algorithms of a plurality of types of smoothing processing that differ in processing delay amount indicating the delay between specific detection position data (first detection position data) detected and detection position data (second detection position data) resulting from smoothing-processing the specific detection position data, and executes the algorithm. The display processing unit 131 causes the display unit 14 to display a movement locus on the screen as a result of the operation medium moving in contact with the screen, based on the detection position data (second detection position data) output from the pen input driver 110.

Thus, the laptop PC 1 according to this embodiment selects smoothing processing different in processing performance and processing delay amount depending on the status of drawing (for example, the movement speed of the pen), and consequently can perform smoothing processing appropriately while keeping input delay within an allowable range. In other words, the laptop PC 1 according to this embodiment can improve both the drawing quality and the input responsiveness in a well-balanced manner.

Figure 11:
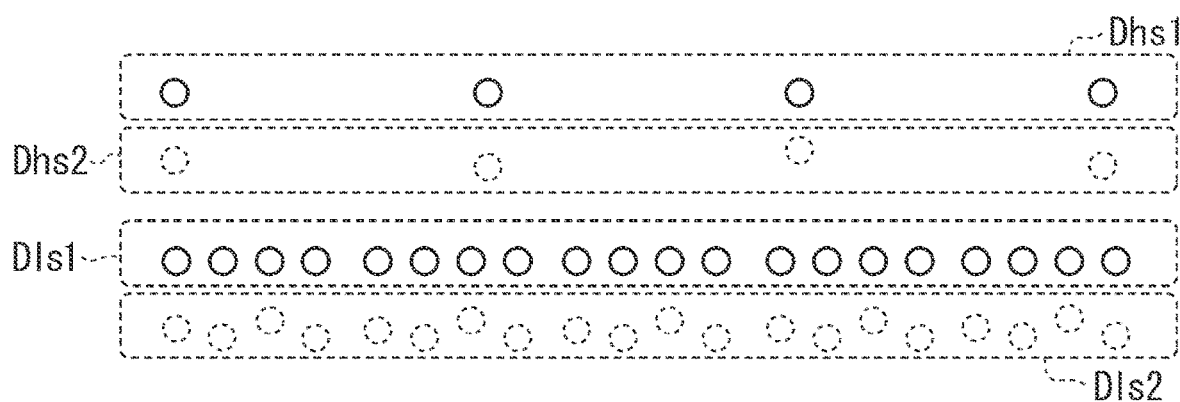
FIG. 11 is a diagram illustrating the relationship between the movement speed of the pen and noise.

FIG. 11 is a diagram illustrating the relationship between the movement speed of the pen and noise in this embodiment.

In the example illustrated in FIG. 11, Dhs1 is a sample string of detection position data not containing noise in the case where the movement speed of the pen is fast (high speed), Dhs2 is a sample string of detection position data containing noise in the case where the movement speed of the pen is fast (high speed), Dls1 is a sample string of detection position data not containing noise in the case where the movement speed of the pen is slow (low speed), and Dls2 is a sample string of detection position data containing noise in the case where the movement speed of the pen is slow (low speed).

Comparison between the case where the movement speed of the pen is fast (high speed) and the case where the movement speed of the pen is slow (low speed) reveals the following: In the case where the movement speed of the pen is fast (high speed), noise is not easily noticeable, and smoothing processing with low processing performance is acceptable. In the case where the movement speed of the pen is slow (low speed), noise is easily noticeable, and smoothing processing with high processing performance is required. Hence, in the case where the movement speed of the pen is fast (high speed), the laptop PC 1 according to this embodiment selects and executes smoothing processing with low processing performance and a small processing delay amount, and consequently can perform smoothing processing appropriately while keeping input delay within an allowable range. In the case where the movement speed of the pen is slow (low speed), the laptop PC 1 according to this embodiment selects and executes smoothing processing with high processing performance and a large processing delay amount, and consequently can perform smoothing processing appropriately while keeping input delay within an allowable range.

In this embodiment, the status of drawing (movement parameter) includes the movement speed of the operation medium such as a pen on the screen. The pen input driver 110 selects and executes smoothing processing (algorithm) different in sample delay count, depending on the movement speed.

Thus, the laptop PC 1 according to this embodiment can perform smoothing processing more appropriately while keeping input delay within an allowable range, by a simple method of using the movement speed of the operation medium such as a pen.

In this embodiment, in the case where the movement speed (for example, movement speed Vt) is not less than a first threshold (for example, threshold Vth1_up), the pen input driver 110 changes to smoothing processing (algorithm) with a lower sample delay count than the currently selected smoothing processing (algorithm). In the case where the movement speed is less than a second threshold (for example, threshold Vth2_dw), the pen input driver 110 changes to smoothing processing (algorithm) with a higher sample delay count than the currently selected smoothing processing (algorithm). The first threshold (for example, threshold Vth1_up) is greater than the second threshold (for example, threshold Vth2_dw) (Vth1_up>Vth2_dw).

Thus, the laptop PC 1 according to this embodiment changes the threshold (for example, Vth1_up>Vth2_dw) between when changing to smoothing processing in the case where the movement speed is fast and when changing to smoothing processing in the case where the movement speed is slow. It is therefore possible to prevent needless changes of smoothing processing, such as successively changing smoothing processing in a short period of time around the threshold.

In this embodiment, the smoothing processing includes first smoothing processing (for example, smoothing processing in the low-speed mode) and second smoothing processing with a lower sample delay count (for example, smoothing processing in the medium-speed mode) than the first smoothing processing. When changing from the first smoothing processing to the second smoothing processing, the pen input driver 110 provides a transition period (for example, transition period CT1) of a predetermined number of samples (for example, four samples). In the transition period (for example, transition period CT1) of the predetermined number of samples, the pen input driver 110 outputs, as detection position data (second detection position data) as a result of smoothing processing, the weighted average of the processing result of the first smoothing processing and the processing result of the second smoothing processing with the weight of the second smoothing processing being increased as the transition progresses. When changing from the second smoothing processing (for example, smoothing processing in the medium-speed mode) to the first smoothing processing (for example, smoothing processing in the low-speed mode), the pen input driver 110 provides transition period CT2 of the sum of the predetermined number of samples (for example, four samples) and one sample. In transition period CT2 of the sum of the predetermined number of samples and one sample, the pen input driver 110 outputs, as detection position data (second detection position data) as a result of smoothing processing, the weighted average of the processing result of the second smoothing processing and the processing result of the first smoothing processing with the weight of the first smoothing processing being increased as the transition progresses.

By providing the transition period in this way, the laptop PC 1 according to this embodiment can reduce occurrence of unnatural and discontinuous drawing when changing smoothing processing.

The laptop PC 1 according to this embodiment includes the main control unit 10 that executes a process based on an OS. The main control unit 10 includes the pen input driver 110 and the display processing unit 131. The pen input driver 110 is implemented by a device driver added to the OS.

Thus, in handwriting input, the laptop PC 1 according to this embodiment can perform smoothing processing appropriately while keeping input delay within an allowable range, without relying on the application 130 executed on the OS.

A control method according to this embodiment is a control method of the laptop PC 1 including: the display unit 14; and the touch sensor unit 35 located on the screen of the display unit 14 and detects contact of an object on the screen, and includes an input processing step and a display processing step. In the input processing step of executing smoothing processing and outputting detection position data (second detection position data) as a result of the smoothing processing, the pen input driver 110 selectively executes smoothing processing different in processing performance and processing delay amount, depending on the status of drawing according to detection position data (first detection position data). In the display processing step, the display processing unit 131 causes the display unit 14 to display a movement locus on the screen as a result of the operation medium moving in contact with the screen, based on the detection position data (second detection position data) output in the input processing step.

Thus, the control method according to this embodiment has the same effects as the laptop PC 1 described above, and can perform smoothing processing appropriately while keeping input delay within an allowable range in handwriting input.

The laptop PC 1 (information processing apparatus) according to this embodiment may have the following structure. The laptop PC 1 (information processing apparatus) according to this embodiment includes: the display unit 14; the touch sensor unit 35 located on the screen of the display unit 14 and detects contact of an object on the screen; a memory (for example, the main memory 12) that temporarily stores a program; and a processor (for example, the CPU 11 and the chipset 21) that executes the program stored in the memory (for example, the main memory 12). The processor performs an input process and a display process, by executing the program stored in the memory. The input process is a process of executing smoothing processing and outputting detection position data (second detection position data) as a result of the smoothing processing, specifically, a process of selectively executing smoothing processing different in processing performance and processing delay amount depending on the status of drawing (for example, the movement speed of the pen) according to detection position data (first detection position data). The display process is a process of causing the display unit 14 to display a movement locus on the screen as a result of the operation medium such as a pen moving in contact with the screen based on the detection position data (second detection position data) output in the input process. For example, the input process is a process of executing an acquisition process, a calculation process, and a selection process. The acquisition process is a process of acquiring a plurality of pieces of detection position data (first detection position data) detected at predetermined detection intervals by the touch sensor unit 35. The calculation process is a process of calculating a movement parameter based on the plurality of pieces of detection position data (first detection position data). The selection process is a process of selecting, based on the movement parameter, an algorithm of specific smoothing processing from algorithms of a plurality of types of smoothing processing that differ in processing delay amount indicating the delay between specific detection position data (first detection position data) detected and detection position data (second detection position data) resulting from smoothing-processing the specific detection position data, and executing the algorithm.

Thus, in handwriting input, the laptop PC 1 according to this embodiment can perform smoothing processing appropriately while keeping input delay within an allowable range.

Second Embodiment

A laptop PC 1a according to a second embodiment will be described below, with reference to drawings.

Figure 12:
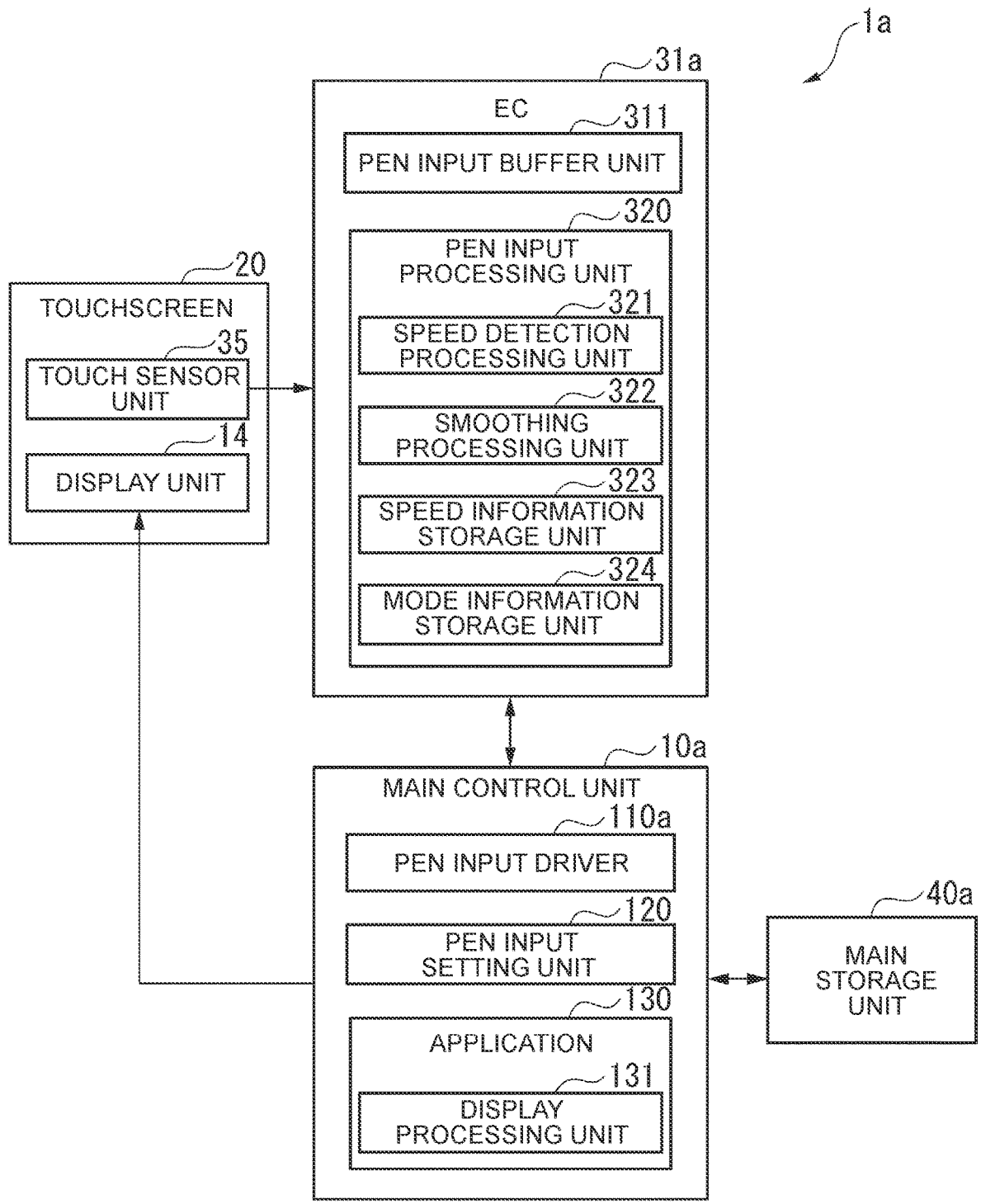
FIG. 12 is a block diagram illustrating an example of the functional structure of a laptop PC.

FIG. 12 is a block diagram illustrating an example of the functional structure of the laptop PC 1a according to the second embodiment. The main hardware structure of the laptop PC 1a according to this embodiment is the same as that in the first embodiment illustrated in FIG. 1, and accordingly its description is omitted here.

In FIG. 12, the same components as those in FIG. 2 are given the same reference symbols, and their description is omitted.

This embodiment describes a modification in which smoothing processing executed by the pen input driver 110 in the first embodiment is executed by an embedded controller 31a.

As illustrated in FIG. 12, the laptop PC 1a includes a main control unit 10a, the touchscreen 20, the embedded controller (EC) 31a, and a main storage unit 40a. FIG. 12 illustrates only the main functional structure of the laptop PC 1a relating to this embodiment.

The embedded controller 31a includes the pen input buffer unit 311 and a pen input processing unit 320.

The pen input processing unit 320 (an example of an input processing unit) is a functional unit resulting from moving the functions of the speed detection processing unit 111, the smoothing processing unit 112, the speed information storage unit 41, and the mode information storage unit 42 in the first embodiment from the pen input driver 110 and the main storage unit 40 to the embedded controller 31a. The pen input processing unit 320 is a functional unit implemented by a CPU in the embedded controller 31a executing a program stored in a memory in the embedded controller 31a. The pen input processing unit 320 includes a speed detection processing unit 321, a smoothing processing unit 322, a speed information storage unit 323, and a mode information storage unit 324.

The speed detection processing unit 321, the smoothing processing unit 322, the speed information storage unit 323, and the mode information storage unit 324 respectively correspond to the speed detection processing unit 111, the smoothing processing unit 112, the speed information storage unit 41, and the mode information storage unit 42 in the first embodiment. The respective functions of the speed detection processing unit 321, the smoothing processing unit 322, the speed information storage unit 323, and the mode information storage unit 324 are the same as those in the first embodiment, and accordingly their description is omitted here.

The pen input processing unit 320 (the smoothing processing unit 322) outputs detection position data (second detection position data) as a result of smoothing processing, to the main control unit 10a.

The main control unit 10a is a functional unit implemented by the CPU 11 and the chipset 21 executing a program stored in the main memory 12, and executes various processes based on an OS. The main control unit 10a includes a pen input driver 110a, the pen input setting unit 120, and the application 130.

The pen input driver 110a is a functional unit implemented by the CPU 11 and the chipset 21, and controls a pen input process (handwriting input process) by the touchscreen 20. The pen input driver 110a acquires, from the embedded controller 31a, detection position data (second detection position data) after processing by the pen input processing unit 320, and outputs the detection position data to the application 130. For example, the pen input driver 110a is a device driver added to the OS (for example, Windows®).

The main storage unit 40a is the same as the main storage unit 40 in the first embodiment, except that it does not include the speed information storage unit 41 and the mode information storage unit 42.

As described above, the laptop PC 1a according to this embodiment includes: the main control unit 10a that executes a process based on an OS; and the embedded controller 31a that is an embedded control unit different from the main control unit 10a. The embedded controller 31a (embedded control unit) includes the pen input processing unit 320 (input processing unit). The pen input processing unit 320 (input processing unit) selectively executes smoothing processing different in processing performance and processing delay amount depending on the status of drawing according to detection position data (first detection position data), and outputs detection position data (second detection position data) as a result of the selectively executed smoothing processing to the main control unit 10a. The main control unit 10a includes the display processing unit 131. The display processing unit 131 causes the display unit 14 to display a movement locus on the screen as a result of the operation medium such as a pen moving in contact with the screen, based on the detection position data (second detection position data) output from the pen input processing unit 320 via the pen input driver 110a.

Thus, in handwriting input, the laptop PC 1a according to this embodiment can perform smoothing processing appropriately while keeping input delay within an allowable range, without relying on the device driver (the pen input driver 110a) and the application 130 executed on the OS.

Third Embodiment

A PC system 100 according to a third embodiment will be described below, with reference to drawings.

While the foregoing first and second embodiments describe the case where the touchscreen 20 is included in the laptop PC 1 (1a) to perform handwriting input such as pen input, the third embodiment describes a modification in which handwriting input such as pen input is performed by the PC system 100 including an external pen tablet 50 having a touchscreen 52 and a laptop PC 1b.

Figure 13:
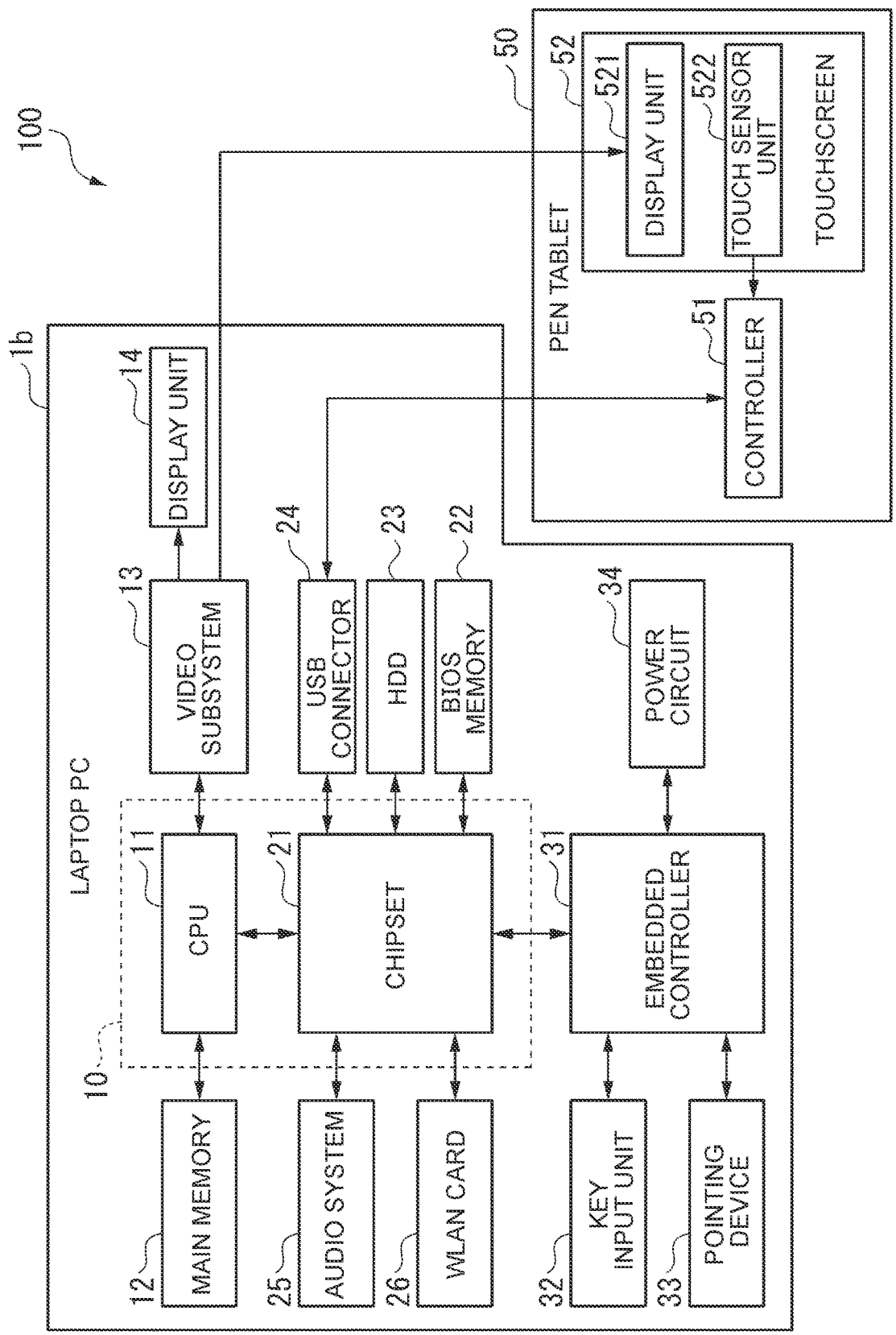
FIG. 13 is a diagram illustrating an example of the main hardware structure of a PC system.

FIG. 13 is a diagram illustrating an example of the main hardware structure of the PC system 100 according to this embodiment.

As illustrated in FIG. 13, the PC system 100 (an example of an information processing system) includes the laptop PC 1b and the pen tablet 50.

In FIG. 13, the same components as those in FIG. 1 are given the same reference symbols, and their description is omitted.

The laptop PC 1b (an example of an information processing apparatus) has the same hardware structure as the foregoing laptop PC 1 (1a), except that it does not include the touchscreen 20 (the touch sensor unit 35).

The pen tablet 50 is a tablet terminal capable of handwriting input such as pen input, and includes a controller 51 and the touchscreen 52.

The controller 51 (an example of an embedded control unit) is, for example, a processor including a CPU, and performs overall control on the pen tablet 50. In the case of performing handwriting input such as pen input, the controller 51 executes the same processes as the foregoing embedded controller 31 (31a). That is, the controller 51 may have the same functions as the foregoing pen input buffer unit 311 and pen input processing unit 320.

The controller 51 is connected to the chipset 21 (the main control unit 10 (10a)) via the USB connector 24. Using a USB interface, the controller 51 smoothing-processes detection position data (first detection position data) detected by a touch sensor unit 522, and outputs detection position data (second detection position data) as a result of the processing to the main control unit 10 (10a).

The touchscreen 52 includes a display unit 521 and the touch sensor unit 522, and functions in the same way as the foregoing touchscreen 20. The display unit 521 and the touch sensor unit 522 in this embodiment respectively correspond to the display unit 14 and the touch sensor unit 35 in the first and second embodiments.

The display unit 521 is connected to the main control unit 10 (10a) via the video subsystem 13, for example, by HDMI (High-Definition Multimedia Interface®) or DP (Display Port). The main control unit 10 (10a) causes the display unit 521 to display a movement locus on the screen of the display unit 521 as a result of the operation medium moving in contact with the screen based on the detection position data output from the controller 51, by HDMI® or DP.

The operation of the PC system 100 according to this embodiment will be described below.

In this embodiment, instead of the embedded controller 31a in the second embodiment, the controller 51 may have the same functions as the pen input processing unit 320 and execute smoothing processing. Alternatively, the pen input driver 110 may execute smoothing processing, as in the first embodiment. The details of smoothing are the same as those in the first and second embodiments, and accordingly their description is omitted here.

As described above, the PC system 100 (information processing system) according to this embodiment includes the display unit 521, the touch sensor unit 522, an input processing unit (the pen input driver 110 or the controller 51), and the display processing unit 131. The touch sensor unit 522 is located on the screen of the display unit 521, and detects contact of an object on the screen. The input processing unit (the pen input driver 110 or the controller 51) selectively executes smoothing processing different in processing performance and processing delay amount depending on the status of drawing according to detection position data (first detection position data), and outputs detection position data (second detection position data) as a result of the smoothing processing.

Thus, the PC system 100 according to this embodiment has the same effects as the foregoing laptop PC 1 (1a), and can perform smoothing processing appropriately while keeping input delay within an allowable range. Moreover, the PC system 100 according to this embodiment can improve both the drawing quality and the input responsiveness in handwriting input in a well-balanced manner, without relying on applications.

The present disclosure is not limited to the foregoing embodiments, and changes can be made without departing from the scope of the present disclosure.

For example, although the foregoing embodiments describe the laptop PC 1 (1*a*, 1*b*) as an example of an information processing apparatus, the present disclosure is not limited to such, and other information processing apparatuses such as a tablet terminal apparatus, a desktop PC, and a smartphone may be used. Moreover, an information processing system is not limited to the PC system 100 including the laptop PC 1*b*, and may include any of the above-mentioned other information processing apparatuses.

Although the foregoing embodiments describe an example of using the movement speed as the status of drawing, the present disclosure is not limited to such. Examples of the status of drawing include the movement speed of the pen (for example, average speed according to a plurality of pieces of detection position data), the change in movement speed (for example, movement acceleration), the change in movement angle on the screen, the movement distance in a predetermined time interval, and the drawing shape (curve, straight line, letter, etc.).

For example, in the case where the status of drawing is the change in movement speed (for example, movement acceleration), the input processing unit (the pen input driver 110, the pen input processing unit 320, or the controller 51) may execute smoothing processing with a smaller delay amount (lower sample delay count) in the case where the change in movement speed increases, and execute smoothing processing with a larger delay amount (higher sample delay count) in the case where the change in movement speed decreases.

For example, in the case where the status of drawing is the change in movement angle on the screen, the input processing unit (the pen input driver 110, the pen input processing unit 320, or the controller 51) may execute smoothing processing with a larger delay amount (higher sample delay count) in the case where the change in movement angle is large, and execute smoothing processing with a smaller delay amount (lower sample delay count) in the case where the change in movement angle is small.

For example, in the case where the status of drawing is the movement distance in a predetermined time interval, the input processing unit (the pen input driver 110, the pen input processing unit 320, or the controller 51) may execute smoothing processing with a smaller delay amount (lower sample delay count) in the case where the movement distance is long, and execute smoothing processing with a larger delay amount (higher sample delay count) in the case where the movement distance is short.

For example, in the case where the status of drawing is the drawing shape (curve, straight line, letter, etc.), the input processing unit (the pen input driver 110, the pen input processing unit 320, or the controller 51) may execute smoothing processing with a smaller delay amount (lower sample delay count) in the case where the drawing shape is a straight line, and execute smoothing processing with a larger delay amount (higher sample delay count) in the case where the drawing shape is a curve or a letter.

The status of drawing may be any combination of the movement speed of the pen and the foregoing drawing statuses.

Although the foregoing embodiments describe an example of using a pen as an operation medium in handwriting input, the present disclosure is not limited to such. For example, other operation media such as a user's finger and a dedicated electronic pen may be used.

Although the foregoing embodiments describe an example in which the predetermined number of samples constituting each group are four samples, the present disclosure is not limited to such. The predetermined number of samples constituting each group may be three samples or less, or five samples or more.

In the foregoing embodiments, the method of smoothing processing is not limited as long as smoothing processing different in processing performance and processing delay amount is used.

Although the foregoing embodiments describe an example in which smoothing processing is executed by the pen input driver 110, the pen input processing unit 320 in the embedded controller 31*a*, or the controller 51, the present disclosure is not limited to such. For example, smoothing processing may be executed by the application 130.

Each component in the foregoing laptop PC 1 (1*a*) and PC system 100 includes a computer system. Processes in the components in the foregoing laptop PC 1 (1*a*) and PC system 100 may be performed by recoding a program for implementing the functions of the components in the foregoing laptop PC 1 (1*a*) and PC system 100 on a computer-readable recording medium and causing a computer system to read and execute the program recorded on the recording medium. Herein, the expression "causing a computer system to read and execute the program recorded on the recording medium" includes installing the program in the computer system. The term "computer system" herein includes an OS and hardware such as peripherals.

The "computer system" may include a plurality of computer apparatuses connected via a network such as the Internet, a WAN, a LAN, or a communication line such as a dedicated line. The "computer-readable recording medium" refers to a portable medium such as a flexible disk, a magneto-optical disc, a ROM, or a CD-ROM, or a storage device such as a hard disk embedded in the computer system. Thus, the recording medium storing the program may be a non-transitory recording medium such as a CD-ROM.

The recording medium includes a recording medium internally or externally provided so as to be accessible from a distribution server for distributing the program. A configuration in which the program is divided into a plurality of parts and the components in the laptop PC 1 (1*a*) and the PC system 100 combine the parts after the parts are downloaded at different timings may be adopted, and distribution servers for distributing the parts into which the program is divided may be different. The "computer-readable recording medium" includes a medium that holds the program for a certain period of time, such as a volatile memory (RAM) inside a computer system serving as a server or a client when the program is transmitted via a network. The program may be a program for implementing part of the above-described functions. The program may be a differential file (differential program) that can implement the above-described functions in combination with a program already recorded in the computer system.

Part or all of the above-described functions may be implemented as an integrated circuit such as large scale integration (LSI). The above-described functions may be individually formed as a processor, or partially or wholly integrated into a processor. A method of forming an integrated circuit is not limited to LSI, and may be implemented by a dedicated circuit or a general-purpose processor. In the case where integrated circuit technology that can replace LSI emerges as a result of the advancement of semiconductor technology, an integrated circuit based on such technology may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An information processing apparatus comprising:
a touchscreen display that detects, as a detection position, contact of an object on a screen of the touchscreen display; and
a processor coupled to the touchscreen display, the processor being programmed to:
acquire a plurality of first detection positions on the screen of the touchscreen display, the plurality of first detection positions being detected at predetermined detection intervals,
calculate, based on the plurality of first detection positions, a movement parameter representing movement of the object during detection of the plurality of first detection positions and including a movement speed of the detection on the screen of the touchscreen display,
select, based on the movement parameter depending on the movement speed, a first smoothing algorithm or a second smoothing algorithm, wherein
the first smoothing algorithm and the second smoothing algorithm are different from each other in a processing delay between detecting a particular detection position and output a smoothed detection position corresponding to that particular detecting position,
calculate the movement speed in units of a predetermined number of samples of the plurality of first detection position,
switch the smoothing algorithm different in sample delay count in units of the predetermined number of samples,
provide, when changing from the first smoothing algorithm to the second smoothing algorithm, a transition period of the predetermined number of samples,
output, in the transition period of the predetermined number of samples, a weighted average of a processing result of the first smoothing algorithm and a processing result of the second smoothing algorithm with a weight of the second smoothing algorithm being increased as transition progresses, as a plurality of second detection positions;
provide, when changing from the second smoothing algorithm to the first smoothing algorithm, a transition period of a sum of the predetermined number of samples and one sample, and
output, in the transition period of the sum of the predetermined number of samples and one sample, a weighted average of a processing result of the second smoothing algorithm and a processing result of the first smoothing algorithm with a weight of the first smoothing algorithm being increased as transition progresses, as the second detection positions, wherein
the touchscreen display displays a movement locus on the screen of the touchscreen display based on the plurality of second detection positions obtained by executing the selected one of the first smoothing algorithm or the second smoothing algorithm on the plurality of first detection positions.

2. An information processing apparatus comprising:
a display unit;
a touch sensor unit which is disposed on a screen of the display unit and detects contact of an object on the screen of the display unit;
an input processing unit that executes:
an acquisition process of acquiring a plurality of first detection position data on the screen of the display unit detected at predetermined detection intervals by the touch sensor unit as a result of an operation medium contacting the screen of the display unit,
a calculation process of calculating, based on the plurality of first detection position data, a movement parameter representing movement of the operation medium during detection of the plurality of first detection position data, wherein
the movement parameter includes a movement speed of the operation medium on the screen of the display unit;
a selection process of selecting, based on the movement parameter depending on the movement speed, an algorithm of specific smoothing processing from algorithms of a plurality of types of smoothing processing, wherein
each of the algorithms of the plurality of types of smoothing processing is a process of smoothing a drawn movement locus by noise reduction and differs in processing delay amount indicating a delay between specific first detection position data detected and second detection position data resulting from smoothing-processing the first detection position data, and executing the selected algorithm of smoothing processing, wherein
the plurality of types of smoothing processing include a first smoothing processing and a second smoothing processing with a lower sample delay count than the first smoothing processing;
calculation process of calculating the movement speed in units of a predetermined number of samples of the plurality of first detection position;
switching process of switching the smoothing algorithm different in sample delay count in units of the predetermined number of samples;
when changing from the first smoothing processing to the second smoothing processing, a transition period of the predetermined number of samples, and, in the transition period of the predetermined number of samples, outputs a weighted average of a processing result of the first smoothing processing and a processing result of the second smoothing processing with a weight of the second smoothing processing being increased as transition progresses, as the second detection position data;
when changing from the second smoothing processing to the first smoothing processing, a transition period of a sum of the predetermined number of samples and one sample, and, in the transition period of the sum of the predetermined number of samples and one sample, outputs a weighted average of a processing result of the second smoothing processing and a processing result of the first smoothing processing with a weight of the first smoothing processing being increased as transition progresses, as the second detection position data; and a display processing unit which causes the display unit to display a movement locus on the screen of the display unit as a result of the operation medium moving in contact with the screen of the display unit, based on the second detection position data output from the input processing unit.

3. The information processing apparatus according to claim 2, wherein the input processing unit changes to an algorithm of smoothing processing with a lower sample delay count than the selected algorithm of smoothing processing, in a case where the movement speed is not less than a first threshold; and changes to an algorithm of smoothing processing with a higher sample delay count than the selected algorithm of smoothing processing, in a case where the movement speed is less than a second threshold.

4. The information processing apparatus according to claim 3, wherein the first threshold is greater than the second threshold.

5. The information processing apparatus according to claim 2, comprising a main control unit which executes a process based on an operating system (OS), wherein the main control unit includes the input processing unit and the display processing unit, and wherein the input processing unit is implemented by a device driver added to the OS.

6. The information processing apparatus according to claim 2, comprising:

a main control unit which executes a process based on an operating system (OS); and an embedded control unit different from the main control unit, wherein the embedded control unit includes the input processing unit, wherein the main control unit includes the display processing unit, and wherein the input processing unit outputs the second detection position data to the main control unit.

7. A control method of an information processing apparatus including: a display unit; and a touch sensor unit which is disposed on a screen of the display unit and detects contact of an object on the screen of the display unit, the control method comprising:

acquiring a plurality of first detection position data on the screen of the display unit detected at predetermined detection intervals by the touch sensor unit as a result of an operation medium contacting the screen of the display unit;

calculating, based on the plurality of first detection position data, a movement parameter representing movement of the operation medium during detection of the plurality of first detection position data, wherein the movement parameter includes a movement speed of the operation medium on the screen of the display unit;

selecting, based on the movement parameter depending on the movement speed, an algorithm of specific smoothing processing from algorithms of a plurality of types of smoothing processing, wherein each of the algorithms of the plurality of types of smoothing processing is a process of smoothing a drawn movement locus by noise reduction and differ in processing delay amount indicating a delay between specific first detection position data detected and second detection position data resulting from smoothing- processing the first detection position data, and executing the selected algorithm of smoothing processing, calculating the movement speed in units of a predetermined number of samples of the plurality of first detection position, switching the smoothing algorithm different in sample delay count in units of the predetermined number of samples, wherein the plurality of types of smoothing processing include first smoothing processing and second smoothing processing with a lower sample delay count than the first smoothing processing;

when changing from the first smoothing processing to the second smoothing processing, a transition period of the predetermined number of samples, and, in the transition period of the predetermined number of samples, outputs a weighted average of a processing result of the first smoothing processing and a processing result of the second smoothing processing with a weight of the second smoothing processing being increased as transition progresses, as the second detection position data;

when changing from the second smoothing processing to the first smoothing processing, a transition period of a sum of the predetermined number of samples and one sample, and, in the transition period of the sum of the predetermined number of samples and one sample, outputs a weighted average of a processing result of the second smoothing processing and a processing result of the first smoothing processing with a weight of the first smoothing processing being increased as transition progresses, as the second detection position data; and causing the display unit to display a movement locus on the screen of the display unit as a result of the operation medium moving in contact with the screen of the display unit, based on the second detection position data.

* * * * *